March 30, 1943.   J. F. KANE   2,315,060
TRACTION CHAIN FASTENING DEVICE
Filed July 21, 1941
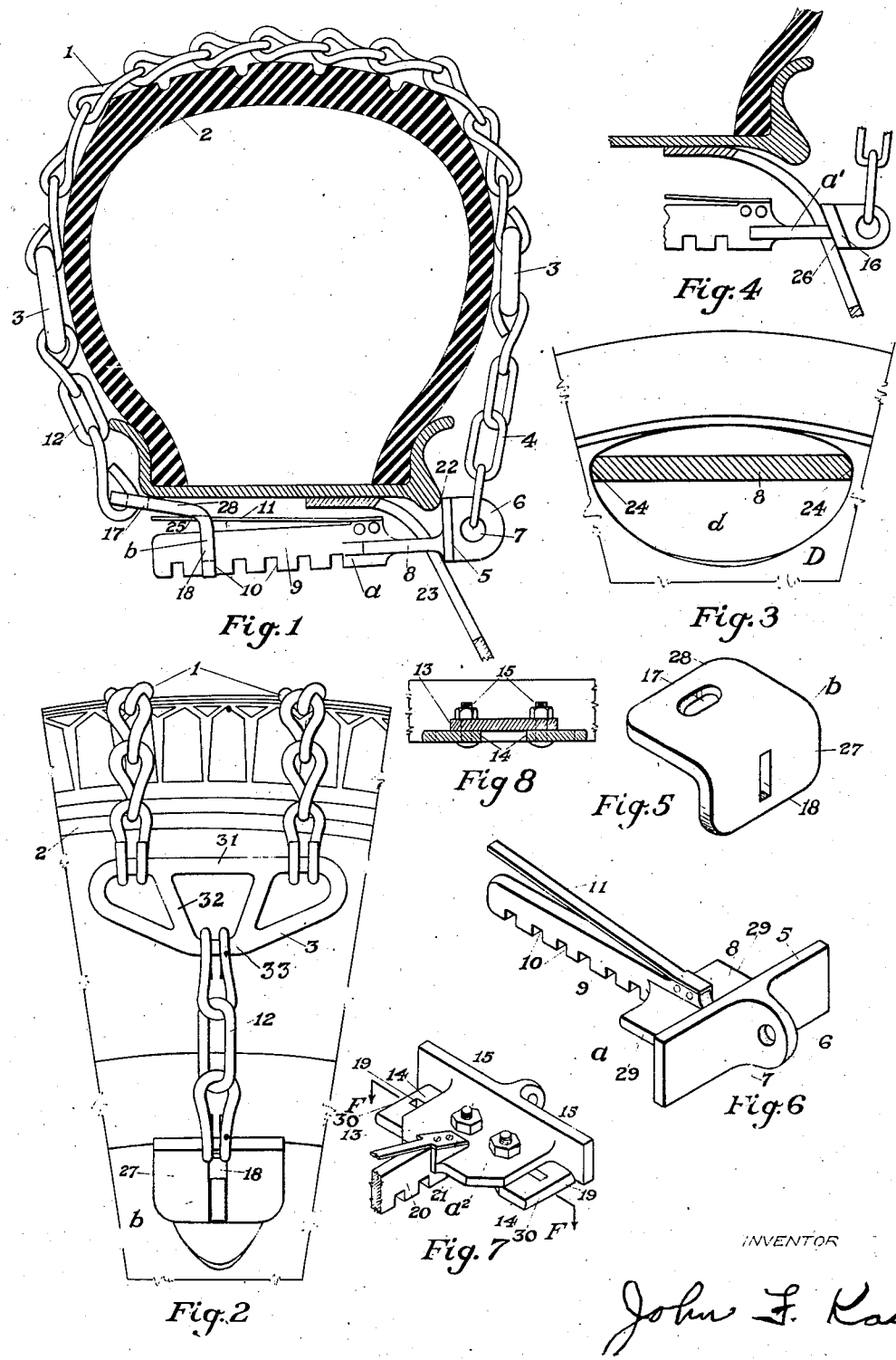
INVENTOR
John F. Kane Patented Mar. 30, 1943

2,315,060

UNITED STATES PATENT OFFICE 2,315,060

TRACTION CHAIN FASTENING DEVICE

John F. Kane, Fall River, Mass., assignor to James T. Kane and himself, Fall River, and James H. Kane, Boston, Mass., copartners doing business under the firm name of Kane Chain Company, Fall River, Mass.

Application July 21, 1941, Serial No. 403,279

13 Claims. (Cl. 152—237)

My invention relates to the manner in fastening traction cross chains of the emergency type to the modern disc type of wheel, making use of a locking arrangement which acts in conjunction with the walls of a circumferential opening in said wheel disc, just below the rim, and is an improvement over the device described in my pending patent application, Serial No. 329,336, filed April 12, 1940.

An important object of my invention is to provide an improved device for fastening traction cross chains to a disc wheel, of such a character that it can be easily and quickly attached or removed, without moving the wheel either along or off the ground, it being particularly adapted for use on wheels of trucks, buses, military and other like vehicles.

Another object of the invention is to fix to the wheel, both laterally and radially, the fastening part of the unit, while allowing a slight creep in the traction cross chains back and forth along the tire.

A further object of the invention is to provide a device which can be adjusted to fit disc openings of varying sizes and types.

A still further object is to provide an adjustable means for fastening the ends of the unit together, with the fastener in its position fixed to the wheel and so constructed that it can be easily secured to said wheel and adjusted to fit different sized tires.

Further objects and advantages appearing as the description proceeds, the invention resides in the combination and arrangement of parts and in the details of construction hereinafter described and claimed, it being understood that various changes in form, proportion and details of construction may be resorted to without departing from the spirit, or sacrificing any advantage of the invention.

Referring to the drawing:

Figure 1 is a cross sectional view through part of a wheel disc, rim and tire, showing the chain assembly and fastening device in position on the wheel.

Figure 2 is a front elevational view showing the outside of a wheel and tire and illustrates the manner in which the traction cross chains combine with the fastening part of the assembly.

Figure 3 is a detail view of the lock formed by the locking member acting in conjunction with the walls of a wheel disc opening.

Figure 4 is a partial cross sectional view through the wheel disc, rim and tire showing a modified form of locking member in a lower position on the wheel disc.

Figure 5 is an isometric view of the receiving member.

Figure 6 is an isometric view of the locking member.

Figure 7 is a partial isometric view of a further modification of the locking member, showing an adjustable flange extension.

Figure 8 is a detail of section F—F shown in Figure 7 and is taken through the adjustable flange extension of the locking member.

The locking member as a unit, with its modifications, will be denoted by the letters $a$, $a'$ and $a^2$.

The receiving member as a unit will be denoted by the letter $b$.

In Figure 3, D denotes a wheel disc with opening $d$.

Referring to the drawing by numeral, numeral 1 refers to a pair of traction chains partly encircling a tire 2, the ends of which are connected to spacing frames 3, which hold said chains in position on the tire.

Each spacing frame, which is shown trapezoidal in shape, includes a horizontal member 31, to which the traction chains are connected, joined by web members 32, to a shorter horizontal member 33. A side chain 4 and 12 extends from this member on the spacing frame on both sides of the wheel, and on the inside, this chain 4 is connected to the locking member $a$.

Locking member $a$ is for use on disc wheels having spaced circumferential openings in close proximity to the rim and is the form most adapted for general use. It comprises a vertical leg 5 with a projecting outstanding ear 6 on one side, said ear having an aperture 7 for fastening to the side chain, while from the opposite side projects a flange extension 8 with opposite rectilinear sides 29 and a vertical elongate tongue 9, having a number of equally spaced rectangular indentaitons along its edge on the form of teeth 10, with a flat spring 11 attached.

The outside spacing frame 3, which is fastened to said traction chains, is connected to the receiving member by a side chain 12.

A modified form of locking member $a'$, as disclosed in Figure 4, is identical to form $a$ except that an oblique leg 16, rather than a vertical leg, appears in this species. This form is used where the wheel disc openings are at too great a distance from the rim to allow the use of a locking member having a vertical leg, similar to 5 on member $a$.

The disc, on this type of wheel, extends obliquely for a distance below the rim, and to insure the leg on the locking member bearing against the inside face of the disc of the wheel 26, said leg is given the same general oblique slope of the wheel disc.

A further modified form of locking member $a^2$, as disclosed in Figures 7 and 8, provides for an adjustable flange extension to fit various sized wheel disc openings, said flange extension 13 having attached to it near each end laterally adjustable members 14, with opposite rectilinear sides 30, each member containing a lateral slot 19 to provide for insertion of a connecting member 15 from said flange extension at an adjustable position and to provide for clamping the sliding members to said flange extension at the adjusted position.

The elongated tongue 20, shown in part in Figure 7, also differs from that of the other forms in that it has a sloped top surface at one end (see 21 in Figure 7), to provide for adequate clearance between said elongated tongue 20 and the curved part of the rim on that type wheel having disc openings extending partly into said rim.

The receiving member $b$ consists of a vertical leg 27 and an angular leg 28 with an opening 17 in the angular leg for fastening to the side chain 12 and an opening 18 in the vertical leg through which the elongated tongue and flat spring of the locking member is inserted, for the purpose of engaging and fastening the ends of the unit together.

Describing the manner in which the unit is attached to a wheel, the end containing the locking member $a$, $a'$ or $a^2$, is placed in position on the inside of the tire and the elongated tongue with attached spring and flange extension (either 8 and 9, Figures 1 and 6 or 13 and 20, Figure 7) on said locking member is inserted through one of the openings in the wheel disc $d$, just below the rim, as disclosed in section in Figure 3.

It is manually pulled into position from the outside, with the front face of the vertical leg of said member bearing against the inner face of the rim along its top edge 22 and against the inner face of the disc along its lower edge 23 and with the opposite rectilinear outer sides of the flange extension engaging the walls of the disc opening (see 24—24, Figure 3) directly upon insertion therein, resulting in a lock being formed between this member and the wheel.

The end of the assembly containing the receiving member $b$ is placed in position around the front of the tire, with said member positioned under the rim, to engage the locking member.

The flat spring 11 of the locking member, which projects as a cantilever diagonally upward from the elongated tongue is depressed against the top of said tongue (9, Figures 1 and 6, or 20, Figure 7), which is thereupon inserted through the opening 18 in the vertical leg of the receiving member. When the cross chains are snugly in position encircling the tire, the receiving member $b$ is lifted, resulting in the faces of the indentation of the elongated tongue 10, in adjusted position, engaging the walls of the vertical face of said receiving member, below the rectangular opening 18 in said member and thus fastening the assembly together. Manual pressure on the flat spring 11 is then released, thereupon causing it to assume a restrained position 25 against the under side of the upper leg of the receiving member 28, thus preventing said tongue from slipping out of its fastening with said receiving member.

When form $a^2$ of locking member is used, the laterally adjustable members 14 attached to the flange extension are first adjusted so that their opposite rectilinear sides will snugly engage the walls of the opening in the wheel disc (similarly to 24, Figure 3) and are fixed in place by tightening the connecting members 15. The locking member is then inserted in the wheel disc opening and fastened to the receiving member $b$, as described above for locking member $a$.

It will be noted that the stress transmitted from the traction chains 1, as they grip the road surface, through the side chains 4 and 12 to the fasteners of the unit, tend to pull the receiving member $b$ outwardly, thus increasing the force which that member exerts on the top face of the indentation in the locking member ($a$, $a'$ or $a^2$) with which it is engaged and thereby furnishing a more secure fastening of the ends of the unit.

The chain assembly can be removed by simply depressing the flat spring 11 to the top of the elongated tongue 9 or 20, lifting the tongue so that the indentation 10 is disengaged from the receiving member $b$ and pulling the receiving member outwardly. The elongated tongue, being released from its engaging member, can then be pushed inwardly, releasing the engagement 24 between the flange member 8 and the wheel disc and freeing the unit.

I claim:

1. In combination with a traction chain assembly for a disc wheel with spaced circumferential openings, a locking means comprising a flange extension having opposite rectilinear sides engageable with the side walls of one of said openings upon insertion therein having an element engaging the inner faces of the disc and rim and connecting to said chain assembly and an indented tongue with attached spring, a receiving means comprising an angular member fastened to said chain assembly, with an aperture for receiving said tongue and spring and means for adjustably engaging said tongue with said receiving member and for retaining said members in engagement when the assembly is in adjusted position.

2. In combination with a traction chain assembly for a disc wheel with spaced circumferential openings, a locking means comprising a flange extension having opposite rectilinear sides engageable with the sidewalls of said opening upon insertion therein, an element engaging the inner face of the disc and connecting to said chain assembly and having an indented tongue with attached spring, a receiving means comprising an angular member fastened to said chain assembly with an aperture for receiving said tongue and spring and further means for adjustably engaging said tongue with said receiving member and for retaining said members in engagement when the assembly is in adjusted position.

3. In combination with a traction chain assembly for a disc wheel with spaced circumferential openings, a locking means comprising a flange extension with attached laterally movable elements having opposite rectilinear sides shaped to adjustably engage by close contact the sidewalls of said opening upon insertion therein, with means for fixing said elements in adjusted position, an element engaging the inner faces of the disc and rim and connecting to said chain assembly and an indented tongue with attached spring, a receiving means comprising an angular member fastened to said chain assembly and having an aperture for the insertion of said tongue and spring and means for adjustably engaging said tongue with said receiving member and for retaining said members in engagement when the assembly is in adjusted position.

4. In combination with a traction chain assembly, a fastening device consisting of a locking member and receiving member, said locking member comprising a flange extension laterally adjustable, having opposite rectilinear sides shaped to engage by close contact the sidewalls of a disc wheel opening of varying widths, adjacent the rim upon insertion therein, a projecting leg bearing against the inner faces of the disc and rim, an elongated tongue with spaced indentations and an attached spring, said receiving member comprising an angular element having an aperture for insertion of said tongue and spring and means for adjustably engaging said tongue with said receiving member and retaining said members in engagement when the assembly is in adjusted position.

5. A traction chain fastening device for vehicle wheels of the disc type, comprising a locking member having an adjustable flange extension with opposite rectilinear sides shaped to fit into and be locked in place in a disc opening adjacent the rim upon insertion therein, with means for fixing said flange extension in adjusted position, a projecting leg bearing against the inner face of the wheel adjacent said opening, an indented tongue with attached spring, a receiving member containing an aperture for inserting said tongue and spring and means for adjustably engaging said tongue at its coinciding indentation with said receiving member and for retaining said members in engagement when the assembly is in adjusted position.

6 In combination with a traction chain assembly, a fastening device consisting of a locking and receiving member, said locking member comprising a flange extension laterally adjustable, having opposite rectilinear sides shaped to engage by close contact the sidewalls of a disc wheel opening of varying widths, adjacent the rim upon insertion therein, a projecting leg bearing against the inner faces of the disc and rim, an elongated tongue with spaced indentations and an attached spring, said receiving member comprising an angular element having an aperture for insertion of said tongue and spring and means for engaging said tongue at its coinciding indentation with said receiving member and for restraining said spring when the assembly is in adjusted position.

7. In a device of the character described, the combination with a tire and a disc wheel of a traction chain assembly, comprising traction chains, a locking member with a leg positioned to bear against the inner faces of the disc and rim, a flange extension with opposite rectilinear sides shaped to snugly fit into and be locked in said wheel disc opening adjacent the rim upon insertion therein and an indented elongated tongue with spring attached, a receiving member comprising legs angular to each other and containing an aperture for the insertion of said tongue and spring, and means for engaging said tongue at its coinciding indentation with said receiving member and for restraining said spring when the assembly is in adjusted position.

8. In a device of the character described, the combination with a tire and a disc wheel of a traction chain assembly, comprising traction chains, a locking member with a leg positioned to bear against the inner face of the disc, a flange extension with opposite rectilinear sides shaped to snugly fit into and be locked in said wheel disc opening adjacent the rim upon insertion therein and an indented elongated tongue with spring attached, a receiving member comprising legs angular to each other and containing an aperture for insertion of said tongue and spring, and means for engaging said tongue at its coinciding indentation with said receiving member and for restraining said spring when the assembly is in adjusted position.

9. In a device of the character described, the combination with a tire and a disc wheel of a traction chain assembly, comprising traction chains, a locking member with a leg positioned to bear against the inner faces of the wheel disc and rim, a flange extension with connecting laterally movable elements having opposite rectilinear sides shaped to adjustably engage by close contact the side walls of said wheel disc opening upon insertion therein, with means for fixing said elements in adjusted position, and an indented elongated tongue with attached spring, a receiving member comprising legs angular to each other and containing an aperture for insertion of said tongue and spring, and means for engaging said tongue at its coinciding indentation with said receiving member and for restraining said spring when the assembly is in adjusted position.

10. In combination with a traction chain assembly for a disc wheel with spaced circumferential openings, a locking member comprising a flange extension with opposite rectilinear sides shaped to snugly fit into said wheel disc opening adjacent the rim upon insertion therein, a projecting leg having an apertured outstanding ear for fastening to said chain assembly with said leg positioned to bear radially against the inner faces of said disc and rim and an elongated tongue with spaced indentations and an attached spring, a receiving member fastened to the other end of said chain assembly, comprising legs angular to each other and containing an aperture for insertion of said tongue and spring and means for engaging said tongue at its coinciding indentation with said receiving member and for restraining said spring when the assembly is in adjusted position.

11. In combination with a traction chain assembly for a disc wheel with spaced circumferential openings, a locking member comprising a flange extension with opposite rectilinear sides shaped to snugly fit into said wheel disc opening adjacent the rim upon insertion therein, a projecting leg having an apertured outstanding ear for fastening to said chain assembly, with said leg position to bear radially against the inner face of said disc and an elongated tongue with spaced indentations and an attached spring, a receiving member fastened to the other end of said chain assembly, comprising legs angular to each other and containing an aperture for insertion of said tongue and spring and means for engaging said tongue at its coinciding indentation with said receiving member and for restraining said spring when the assembly is in adjusted position.

12. In combination with a traction chain assembly for a disc wheel with spaced circumferential openings, a locking member comprising a flange extension with connecting laterally movable elements having opposite rectilinear sides shaped to adjustably fit into said wheel disc opening adjacent the rim upon insertion therein, with means for fixing said elements in adjusted position, a projecting leg having an apertured outstanding ear for fastening to said chain assembly, with said leg positioned to bear radially against the inner faces of said disc and rim, and an elongated tongue with spaced indentations and an attached spring, a receiving member fastened to the other end of said chain assembly, comprising legs angular to each other, and containing an aperture for insertion of said tongue and spring and means for engaging said tongue at its coinciding indentation with said receiving member and for restraining said spring when the assembly is in adjusted position.

13. In a traction chain fastening device for vehicle wheels of the disc type, the combination of a member having a flange extension with opposite rectilinear sides shaped to snugly fit into and be locked in a wheel disc opening adjacent the rim upon insertion therein, means for engaging the inner faces of said disc and rim, an elongated tongue with spaced indentations and an attached spring, an angular member containing an aperture for insertion of said tongue and spring and means for engaging said tongue at its coinciding indentation with said receiving member and for restraining said spring when the assembly is in adjusted position.

JOHN F. KANE.